United States Patent
Khalaf et al.

(10) Patent No.: US 10,027,269 B2
(45) Date of Patent: Jul. 17, 2018

(54) SOFTWARE-CONTROLLED ELECTRONIC CIRCUIT FOR SWITCHING POWER TO A THREE-PHASE MOTOR

(71) Applicant: Newfrey LLC, New Britain, CT (US)

(72) Inventors: Zuher Naim Khalaf, Troy, MI (US); Jeffrey Scott Aranowski, Macomb, MI (US)

(73) Assignee: Newfrey LLC, New Britain, CT (US)

( * ) Notice: Subject to any disclaimer, the term of this patent is extended or adjusted under 35 U.S.C. 154(b) by 0 days.

(21) Appl. No.: 15/423,749

(22) Filed: Feb. 3, 2017

(65) Prior Publication Data

US 2017/0201203 A1    Jul. 13, 2017

Related U.S. Application Data

(62) Division of application No. 14/991,548, filed on Jan. 8, 2016, now Pat. No. 9,602,041.

(51) Int. Cl.
*H02P 27/08* (2006.01)
*H02P 25/18* (2006.01)
(Continued)

(52) U.S. Cl.
CPC .............. *H02P 27/08* (2013.01); *H02P 21/06* (2013.01); *H02P 23/0077* (2013.01); *H02P 25/18* (2013.01)

(58) Field of Classification Search
CPC ...... H02P 27/08; H02P 21/06; H02P 23/0077; H02P 25/18
(Continued)

(56) References Cited

U.S. PATENT DOCUMENTS 5,552,977 A     9/1996   Xu
5,869,944 A  *  2/1999   Tanina .................... H02P 6/08
                                                      318/293
(Continued)

FOREIGN PATENT DOCUMENTS

CN         201336645         10/2009
CN         102307018         1/2012
(Continued)

OTHER PUBLICATIONS

Toshiba, "Vector Engine and Vector Control," Nov. 23, 2015.
(Continued)

*Primary Examiner* — Kawing Chan
(74) *Attorney, Agent, or Firm* — Harness, Dickey & Pierce, PLC

(57) ABSTRACT

The circuit for controlling a rotating three-phase motor of the type having three interconnected motor coils each corresponding to one of three phases employs a plurality of switching circuit components, each connected to the motor to supply current to one of the coils. A signal generator circuit produces in synchronism with the rotation of the motor a variable duty cycle pulse-width modulated signal for each of the switching circuit components. A logic gating circuit is coupled to the signal generator circuit and to the switching components. The logic gating circuit is operative to cause the switching circuit components to selectively place pairs of motor coils in current conducting states such that when the variable duty cycle pulse-width modulated signals are each concurrently in the same logical on-off state, the logic gating circuit supplies a logical off state to each of the switching circuit components.

5 Claims, 9 Drawing Sheets

| | U | V | W | Uout | Vout | Wout |
|---|---|---|---|---|---|---|
| 98 → | 0 | 0 | 0 | 1 | 1 | 1 |
| | 0 | 0 | 1 | 0 | 0 | 1 |
| | 0 | 1 | 0 | 0 | 1 | 0 |
| | 0 | 1 | 1 | 0 | 1 | 1 |
| 96 { | 1 | 0 | 0 | 1 | 0 | 0 |
| | 1 | 0 | 1 | 1 | 0 | 1 |
| | 1 | 1 | 0 | 1 | 1 | 0 |
| 100 → | 1 | 1 | 1 | 1 | 1 | 1 |

(51) Int. Cl.
*H02P 21/06* (2016.01)
*H02P 23/00* (2016.01)

(58) Field of Classification Search
USPC .............................. 410/400.03; 318/400.03
See application file for complete search history.

(56) References Cited

U.S. PATENT DOCUMENTS

| | | | |
|---|---|---|---|
| 5,955,862 | A | 9/1999 | Nguyen Phuoc |
| 6,316,895 | B1 | 11/2001 | Ramarathnam |
| 6,320,286 | B1 | 11/2001 | Ramarathnam |
| 6,831,442 | B2 | 12/2004 | Hsu et al. |
| 7,825,605 | B2 * | 11/2010 | Zhang ............... H05B 41/2827 310/318 |
| 8,446,120 | B2 | 5/2013 | Forster et al. |
| 2006/0062033 | A1 | 3/2006 | Kimata |
| 2006/0138994 | A1 | 6/2006 | Cheng |
| 2007/0268051 | A1 | 11/2007 | Kerkman |
| 2012/0274247 | A1 * | 11/2012 | Zhao .................... H02P 6/20 318/400.01 |
| 2013/0228402 | A1 | 9/2013 | Leibfried et al. |

FOREIGN PATENT DOCUMENTS

| | | |
|---|---|---|
| CN | 102651632 | 8/2012 |
| CN | 103117698 | 5/2013 |
| CN | 104201958 | 12/2014 |
| CN | 104270062 | 1/2015 |
| DE | 102011118799 A1 | 5/2013 |
| EP | 2634906 A2 | 9/2013 |
| WO | WO2004/036755 A2 | 4/2004 |
| WO | 2012/136946 | 10/2012 |

OTHER PUBLICATIONS

Itoh, Jun-Ichi, et al., "Novel Unity Power Factor Circuits Using Zero-Vector Control for Single-Phase Input Systems," IEEE Transactions on Power Electronics, vol. 15, No. 1, Jan. 2000, pp. 36-43.
Chen, Tsung-Cheng, et al., "A Novel Generalized Zero Vector Control Circuit for High Efficiency Three-phase Inverter," PEDS 2009, pp. 1460-1464.
Chen, Jeng Yue, et al., "Application of Zero-vector Control to Three-phase Inverter," Advanced Materials Research, vols. 591-593, 2012, pp. 1687-1690.
Hink, Karl M., et al., "Low Cost Motor Protection Filters for PWM Drive Applications Stops Motor Damage," 1999 Conference on Power Quality.
International Search Report and the Written Opinion of the International Searching Authority dated Jun. 21, 2017 in corresponding PCT Application No. PCT/US2017/012158.
Lee-Hun Kim et al., "A Novel PWM Switching Technique for Conducted EMI Reduction in Field-Oriented Control of an Induction Motor Drive System," Industrial Electronics Society, 2005, IECON 2005, 31st Annual Conference of IEEE, Piscataway, NJ, USA, pp. 1347-1352, Nov. 6, 2005.
Dusmez Serkan et al., "A New SVPWM Technique for DC Negative Rail Current Sensing at Low Speeds," IEEETransactions on Industrial Electronics, vol. 62, No. 2, pp. 826-831, Feb. 1, 2015.

* cited by examiner

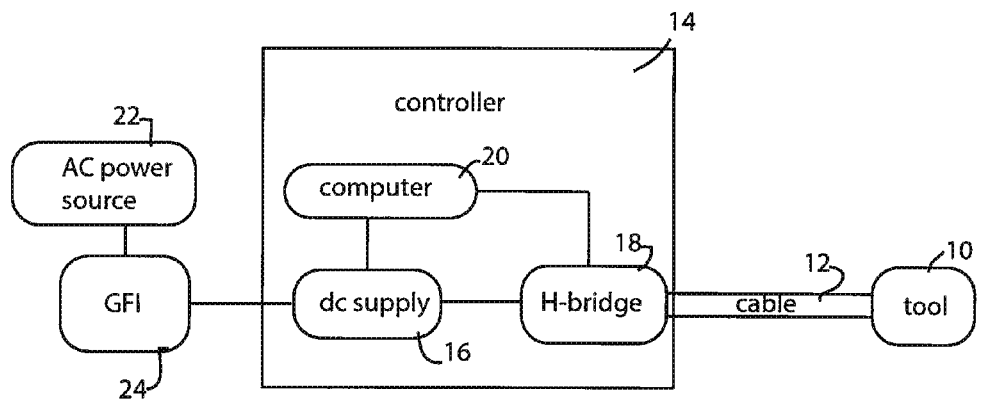
Fig. 1
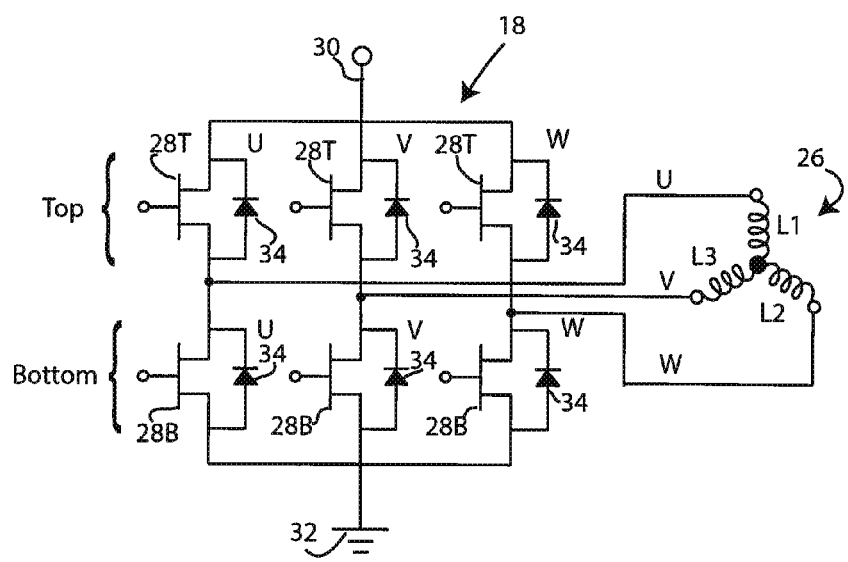
Prior Art    Fig. 2

Prior Art    Fig. 6

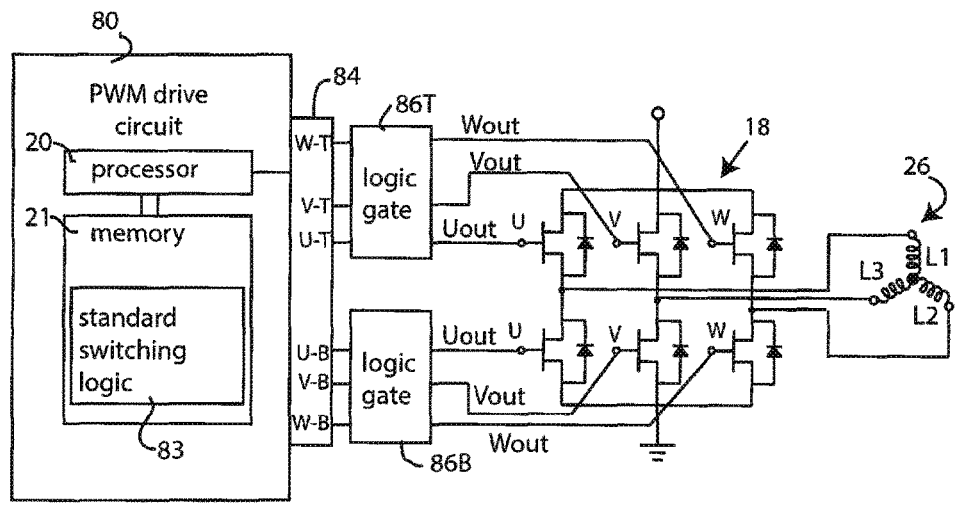
Fig. 8
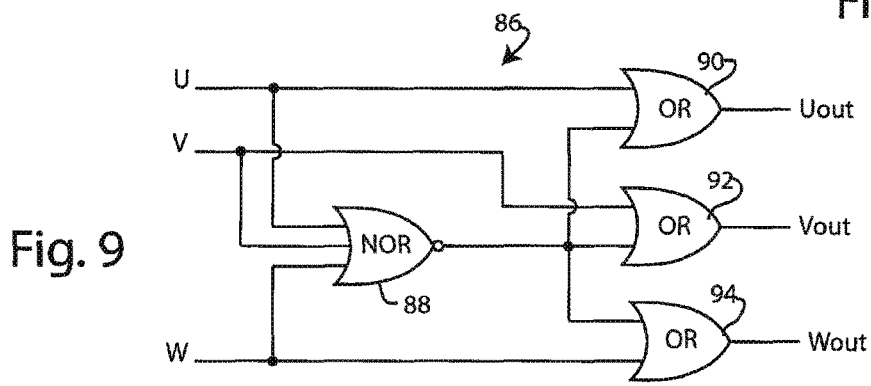
Fig. 9
|  | U | V | W | Uout | Vout | Wout |
|---|---|---|---|---|---|---|
| 98 → | 0 | 0 | 0 | 1 | 1 | 1 |
|  | 0 | 0 | 1 | 0 | 0 | 1 |
|  | 0 | 1 | 0 | 0 | 1 | 0 |
| 96 { | 0 | 1 | 1 | 0 | 1 | 1 |
|  | 1 | 0 | 0 | 1 | 0 | 0 |
|  | 1 | 0 | 1 | 1 | 0 | 1 |
|  | 1 | 1 | 0 | 1 | 1 | 0 |
| 100 → | 1 | 1 | 1 | 1 | 1 | 1 |
Fig. 10

SOFTWARE-CONTROLLED ELECTRONIC CIRCUIT FOR SWITCHING POWER TO A THREE-PHASE MOTOR

CROSS-REFERENCE TO RELATED APPLICATIONS

This application is a divisional of U.S. patent application Ser. No. 14/991,548 filed on Jan. 8, 2016. The entire disclosure of the above application is incorporated herein by reference.

FIELD

The present disclosure relates generally to control of three-phase motors of the type used in industrial power tools. More particularly, the disclosure relates to the manner of generating and applying signals to the H-bridge switching circuit of a three-phase motor.

BACKGROUND

This section provides background information related to the present disclosure which is not necessarily prior art.

Conventionally, the three-phase motor is driven by three sinusoidally varying AC currents phased 120 degrees apart. Many modern designs produce these AC currents using pulse-width modulated (PWM) direct current. The PWM drive waveforms are generated by a software controlled microprocessor whose PWM outputs are fed to an H-bridge switching circuit that essentially connects and disconnects each of the three-phase motor coils to a source of DC current (modulated by PWM to simulate sine wave).

The problem with the conventional PWM design is that there are cyclically occurring instances where the respective coil windings are shorted to each other. While this does not affect the simulated sinusoidal waveforms, it can cause problems. Motor coil windings are essentially inductors, and inductors store electromagnetic energy. When the coil windings are shorted together, the stored electromagnetic energy will inevitably find a leakage path and this can cause spurious leakage currents that adversely affect the microprocessor and the associated power supply components. In some cases these leakage currents are even sufficient to trip the ground fault interrupter (GFI) circuit associated with the power supply components.

SUMMARY

This section provides a general summary of the disclosure, and is not a comprehensive disclosure of its full scope or all of its features.

To address this spurious leakage current problem, the disclosed circuit employs a new way of implementing PWM control. Instead of using the conventional PWM switching topology, where the three phases are periodically shorted together in the H-bridge circuit, the improved switching circuit employs a no-zero vector switching topology. Under this new topology, the resultant three-phase AC waveforms remain the same, so the motor continues to operate as expected. However, the underlying PWM control to produce these AC waveforms is different: periodic shorting of all three phases is avoided and this eliminates spurious leakage currents at their source.

In one embodiment the improvements are effected in the manner by which the PWM drive circuit microprocessor is controlled. In another embodiment a set of additional logic gate circuits are employed to address the problem and to further improve motor efficiency.

Thus according to one aspect, a method is disclosed of controlling a rotating three-phase motor of the type having three interconnected motor coils, each corresponding to one of three phases and each supplied with current through at least one of a plurality of switching circuit components. The method includes generating in synchronism with the rotation of the motor a variable duty cycle pulse-width modulated signal for each of the switching circuit components. The generated variable duty cycle pulse-width modulated signal is used to control switching circuit components to selectively place pairs of motor coils in current conducting states and to develop an associated varying voltage for each of the phases. The varying voltage associated with each of the three phases is indirectly monitored to identify the one phase that is currently at a voltage in between the voltages of the other two phases. Specifically, the in-between phase is identified based on duty cycle; duty cycle is a function of rotor position and/or flux angle, i.e., the angular direction of current flow. Then, for the identified one phase, the variable duty cycle pulse-width modulated signal is generated so that when the switching circuit components of the other two phases are concurrently switched on, the switching circuit component of the identified one phase is not switched on.

In accordance with another aspect, a circuit is disclosed for controlling a rotating three-phase motor of the type having three interconnected motor coils each corresponding to one of three phases. The circuit includes a plurality of switching circuit components, each connected to the motor to supply current to one of said coils. A signal generator circuit produces in synchronism with the rotation of the motor a variable duty cycle pulse-width modulated signal for each of the switching circuit components. The signal generator circuit is coupled to the plurality of switching components to cause the switching circuit components to selectively place pairs of motor coils in current conducting states and to develop an associated varying voltage for each of the phases. A middle phase (in-between phase) identification circuit identifies the one phase that is at a voltage in-between the other two phases by monitoring the cycles of the three phases, where duty cycle is a function of rotor position and/or flux angle (i.e., the angular direction of the current flow). The signal generator circuit is responsive to the middle phase identification circuit and is configured to generate said variable duty cycle pulse-width modulated signal for the identified one phase such that when the switching circuit components of the other two phases are concurrently switched on, the switching circuit component of the identified one phase is not switched on.

In yet another aspect, a circuit is disclosed for controlling a rotating three-phase motor of the type having three interconnected motor coils, each corresponding to one of three phases including a plurality of switching circuit components and each connected to the motor to supply current to one of said coils. A signal generator circuit produces in synchronism with the rotation of the motor a variable duty cycle pulse-width modulated signal for each of the switching circuit components. A logic gating circuit coupled to the signal generator circuit and to the switching components is operative to cause the switching circuit components to selectively place pairs of motor coils in current conducting states such that when the variable duty cycle pulse-width modulated signals are each concurrently in the same logical on-off state, the logic gating circuit supplies a logical off state to each of the switching circuit components, which in the disclosed embodiments are active low components.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 shows an exemplary three-phase power tool with which the disclosed energizing scheme may be employed.

FIG. 2 shows the basic configuration of a conventional H-bridge for driving the three-phase motor.

FIG. 8 shows a second embodiment of the disclosed solution.

FIG. 9 is a detailed view of the logic gate circuit employed in FIG. 8.

FIG. 10 is a truth table, using active low logic, useful for understanding the logic gate circuit of FIG. 9.

Corresponding reference numerals indicate corresponding parts throughout the several views of the drawings.

DETAILED DESCRIPTION

Example embodiments will now be described more fully with reference to the accompanying drawings.

Figure 11:
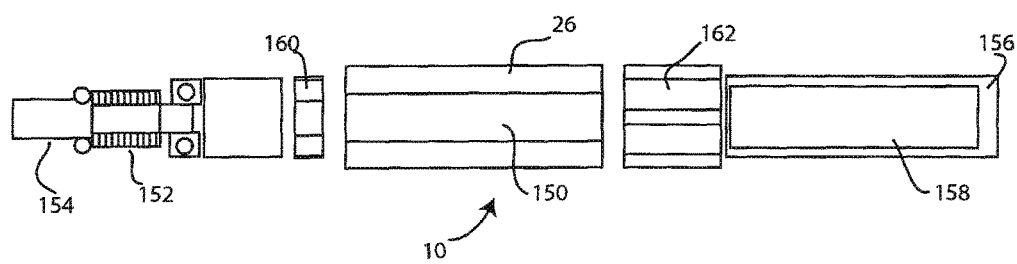
FIG. 11 is an exploded cross sectional view of the mechanical and electrical components of an exemplary tool.

The disclosed three-phase motor drive circuit is useful, for example, in supplying drive current to a three-phase industrial power tool. Therefore, to illustrate how the drive circuit may be used, FIGS. 1 and 11 show an exemplary power tool 10. The tool, which contains the three-phase motor (shown in FIG. 11), is coupled by a long cable 12 to the electronic controller unit 14. The controller unit includes a DC power supply that supplies DC current to an H-bridge circuit 18 and also to a computer or processor-based control circuit 20 that controls generation of a series of variable duty cycle waveforms used to produce the drive current for the motor. The DC power supply 16 is powered from an AC power source 22 connected through a suitable GFI circuit 24.

Some of the internal components of tool 10 have been illustrated in FIG. 11 in an exploded cross-sectional view. The three phase motor windings 26 are disposed concentrically around the rotor 150 and the rotor 150 is mechanically coupled through gearing 152 to the output shaft 154. Disposed within the tool handle 156 is a circuit board 158 that supports the tool electronics, including the processor and memory discussed in connection with FIGS. 5 and 8 below. The tool includes a torque transducer 160 that measures the instantaneous torque delivered through the output 154 and supplies a torque sensor signal to the tool processor to allow the processor to algorithmically control or regulate the torque by controlling the power delivered to the motor windings 26. The tool also includes a rotor position feedback sensor 162 that uses magnetic sensors or Hall-effect sensors to measure the instantaneous angular position of the rotor and supplies an angular position signal to the tool processor. The processor uses this angular position signal to generate pulse-width-modulated pulses that establish sinusoidal drive currents in each of the three phases.

In essence, the processor is programmed to read the present angular position of the rotor and to generate drive signals that energize the coils so that the magnetic field produced by the coils is 90 degrees ahead of the current rotor position. By doing so, the magnetic field pulls the rotor forward in its rotary path.

As noted above, the tool 10 is a three-phase motor. Three-phase motors are used in many industrial applications where precisely controlled, higher power and higher torque are required. A three-phase motor has three windings, one for each phase. The windings are supplied with sinusoidally alternating current supplied as three separate sinusoidal waveforms, each phased 120 degrees apart. In the traditional three-phase motor, a sinusoidally varying alternating current (AC) source supplies the three-phase motor currents. However, today many three-phase motors are driven by a direct current (DC) power supply that employs a pulse-width modulation circuit to supply the three phase motor currents. These direct current power supplies employ an H-bridge switching circuit that produces variable duty cycle waveforms that simulate traditional AC sine waves.

FIG. 2 shows an exemplary three-phase motor 26, supplied with three-phase alternating current through the H-bridge circuit 18. The H-bridge circuit employs a collection of six switching transistors, such as field effect transistors 28T and 28B, that are each turned on and off by drive signals applied to the respective gate terminals by a computer or processor-based control circuit 20 (FIG. 1). Across each of the switching transistors is a diode 34.

The switching transistors are organized into two banks of three transistors each; transistors 28T define a top bank, while transistors 28B define a bottom bank, as illustrated. The transistors 28T in the top bank are coupled to the DC supply rail 30, while the transistors 28B in the bottom bank are coupled to the ground rail 32. The top and bottom banks are connected together, as illustrated, to define pairs of transistors, designated U, V and W. Each pair defines a switching circuit that is connected to a different one of the three motor terminals, also designated U, V and W. Each of the three pairs of switching circuits can be selectively energized to either connect its corresponding motor terminal to the DC supply rail 30 or to the ground rail 32. For example, when transistor 28T-U is switched on and transistor 28B-U is switched off, the motor terminal U is electrically connected to DC supply rail 30. Conversely, when transistor 28T-U is switched off and transistor 28B-U is switched on, the motor terminal U is electrically connected to ground rail 32.

The computer or processor 20 is programmed to selectively switch the transistors to cause currents to flow through the respective motor coils in the desired flow direction and at the desired time. For example, by switching transistor 28T-U on, while concurrently switching transistor 28B-V on, current flows through coils L1 and L3 in a direction from terminal U to terminal V. To induce current flow through coil L1 (and L3) in the opposite direction, the computer or processor would turn on transistors 28T-V and 28B-U. In this fashion the computer or processor 20 can cause current to selectively flow in either direction through each of the three motor coils. Within any given pair of top and bottom bank transistors, the computer or processor 20 is programmed not to switch both top and bottom transistors on at the same time, as this would provide a short circuit between the DC supply rail 30 and ground rail 32.

The respective drive signals are controlled by the computer 20 in a coordinated fashion so that each of the three motor coils L1, L2 and L3 is energized with the proper alternating current waveform. Specifically, the switching transistors are switched on and off in precisely controlled time sequences to produce six pulse-width modulated signals (one for each of the transistors) that result in three sinusoidal alternating currents flowing in the three motor windings.

Figure 3A:
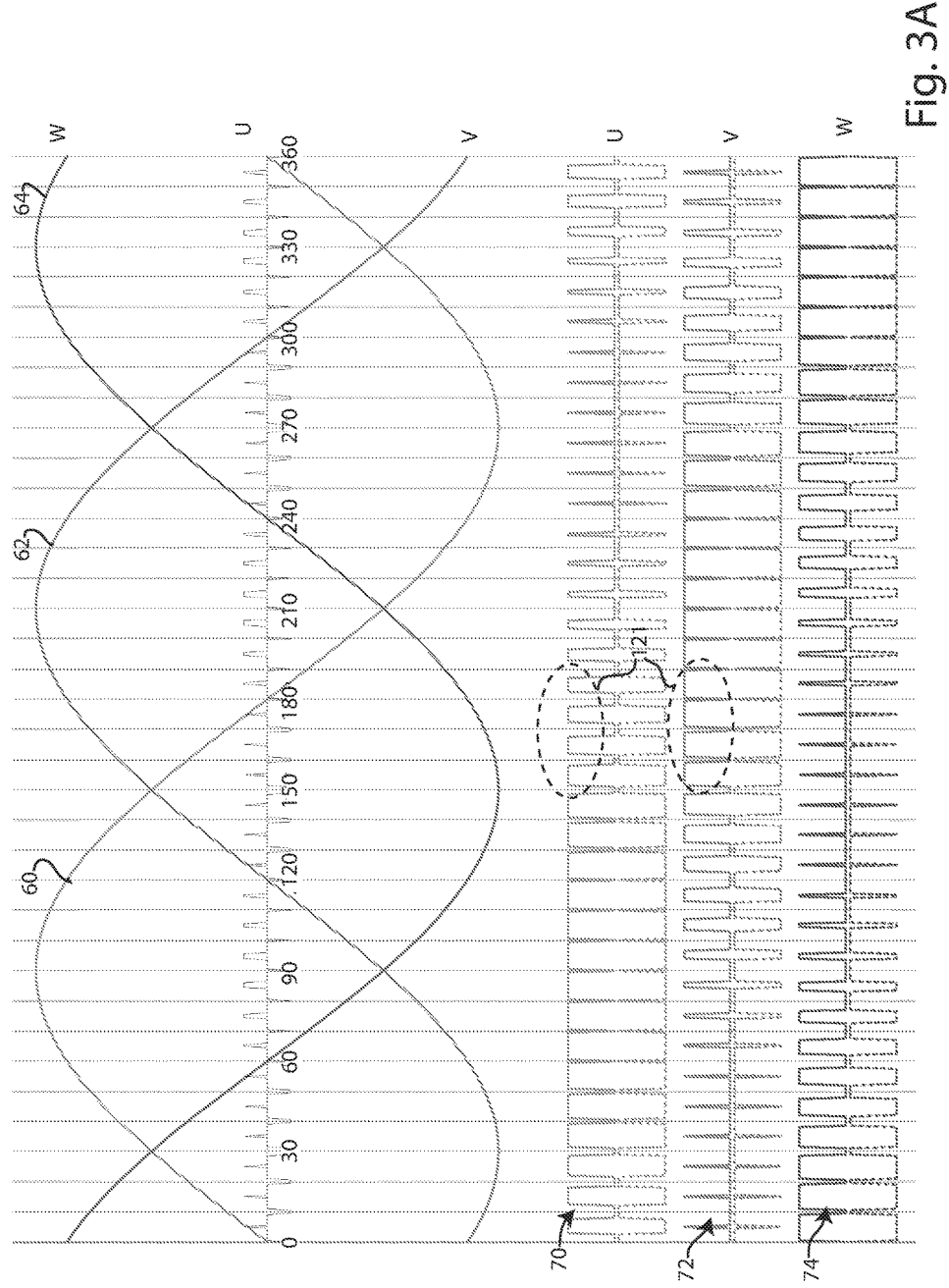
FIG. 3A shows the pulse-width modulation and resulting AC sinusoidal waveforms for the conventional drive scheme, and also shows a graph in the middle of the sine waves representing periods when the motor phases are shorted.

FIG. 3A shows at 60, 62 and 64 how the three sinusoidal current phases u, v and w are generated 120 phase degrees apart. FIG. 3A also shows at 70, 72 and 74 how the variable duty cycle signals are conventionally generated to produce the effect of the three sinusoidal phases 60, 62 and 64. It will be understood that the waveforms at 60, 62 and 64 are motor coil currents, whereas the waveforms at 70, 72 and 74 are the PWM signals used to drive the transistors. Specifically, waveform 70 corresponds to the u phase; waveform 72 corresponds to the v phase and waveform 74 corresponds to the w phase. Note that each variable duty cycle waveform has a constant peak voltage Vp, but that the duty cycle is varied according to a sinusoidal function between 100% duty cycle (as at 70a for the u phase) and 0% duty cycle (as at 70b).

One can understand the variable duty cycle driving scheme by envisioning that energy is delivered to a coil of the motor when the variable duty cycle signal is high, and no energy is delivered when the signal is low. This on-off duty cycle happens quite rapidly, at a rate on the order of 20 kHz (i.e., a frequency several orders of magnitude higher than the 60 Hz frequency of typical household AC). The motor coils are essentially inductors. As with any inductor, the voltage across the motor coil is given by the equation v=L di/dt. That is, the voltage is proportional to the change in current over an increment of time. When the variable duty cycle signal is high, electric charge flows into the inductor (current flows into the coil); when the signal is low the current ceases to flow. Thus by cyclically changing the inflow of current, the variable duty cycle signal can produce the desired sinusoidal voltage across the motor coil.

As will be more fully explained, the circuit of the present disclosure modifies the way in which the high-frequency driving waveforms are generated, with the goal to substantially reduce spurious backflow currents along the cable 12. In conventional three-phase circuits, these spurious backflow currents can sometimes interfere with the controller circuitry, even tripping the GFI circuit 24 in some instances.

Through experimentation we have determined that the likely cause of spurious backflow currents is a combination of several factors. First, when the H-bridge transistors switch using a conventional PWM topology, there are naturally occurring instances where the u, v and w terminals of the inductors are momentarily shorted together (during an interval where neither phase is being supplied with energy from the power supply). When this occurs, energy stored in the inductors flows back through cable 12 and into the controller where the backflow currents can then find a flow path into the ground rail, sometimes tripping the GFI circuit. To appreciate the nature of these backflow currents, a better understanding of the cable 12 will be helpful.

Figure 4:
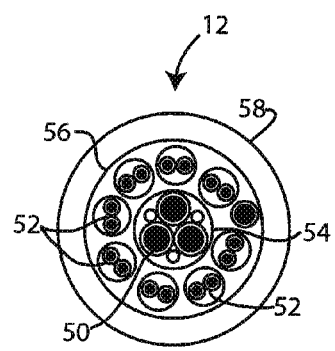
FIG. 4 shows a cross section of an exemplary cable used with three-phase power tools.

FIG. 4 shows the cross section of an exemplary cable of the type used with three-phase power tools. As shown, the cable 12 includes three drive current conductors 50 that supply energy to the respective motor coils. Also included are a plurality of data conductors 52 that carry user commands, as entered by squeezing the tool trigger, back to the controller 14. These data conductors may be shielded from the drive current conductors by a braided shield 54. In addition, a second braided shield 56 is provided concentrically around the drive current conductors and data conductors, and an outer plastic or rubber jacket 58 provides protection for the entire cable assembly.

These backflow currents find a direct conductive path along the drive current conductors 50. In addition, due to the high frequencies present in the current impulse produced when switching occurs, there is also an RF conductive path along the shields within the cable. The RF conductive path is supported along the surfaces of the shields by the skin effect exhibited at high frequencies.

By whatever route traveled, these backflow currents can find their way into the DC supply and ground rails where they can, in some instances, trip the GFI circuit 24.

Rather than attempt to filter out these backflow transient currents, the disclosed circuit is designed to prevent the transients from happening in the first place. In a first embodiment, shown in FIG. 5, the disclosed circuit accomplishes this by altering the way in which the pulse-width modulated signals are generated. The circuit includes a pulse-width modulation (PWM) drive circuit 80 comprising processor 20 and associated non-transitory memory 21. The processor is programmed to monitor the output of the rotor position feedback sensor 162 (FIG. 11) and to coordinate the algorithmic generation of variable duty cycle pulse trains for each of the three phases. The variable duty cycle signals are generated so that the resulting current flowing through each of the motor coils L1, L2 and L3 is sinusoidal.

Specifically, the processor generates six variable duty cycle pulse-width modulated signals, two for each of the three phases. These signals are applied as switching signals to switch the transistor pairs (28T-U, 28B-U), (28T-V, 28B-V) and (28T-W, 28B-W) on and off. For example, applying a pulse-width modulated signal to transistor 28T-U that has transitioned to a high state will route the DC supply voltage to the U terminal of coil L1. By concurrently applying a pulse-width modulated signal to transistor 28B-W that has transitioned to a high state will connect the DC ground to the W terminal of coil L2. This will cause current to flow through coils L1 and L2, due to the fact that the three phases are coupled in a star configuration (i.e., mutually coupled to a common connection point as illustrated in FIG. 2).

The processor is programmed to generate these variable duty cycle PWM signals by generating a reference time-varying sawtooth waveform and by then comparing this time-varying sawtooth waveform to a set of dynamically changing reference values. The processor maintains a reference value for each of the six transistors in the H-bridge circuit 18. The processor compares the instantaneous state of the sawtooth waveform to the reference values. If the sawtooth is rising in amplitude and crosses the reference value, an ON state is applied to the transistor; if the sawtooth is falling in amplitude and crosses the reference value an OFF state is applied to the transistor. The processor changes the duty cycle of each of these signals by making numeric adjustments to the reference value. These numeric adjustments are made as a function of time, in synchronism with the rotation of the motor as detected by the rotor position feedback sensor 162.

In a conventional variable duty cycle pulse-width modulated control system, the PWM drive signals create instances, called the zero vector condition, where the U, V and W terminals of the three coils L1, L2 and L3 are shorted together. The PWM drive technique disclosed here is different in the important respect that the zero vector condition is avoided. In this embodiment the processor is programmed to accomplish this by altering the way the reference values are generated. Specifically, the processor indirectly monitors the states of each of the resulting sinusoidal currents flowing in the motor coils (by monitoring the duty cycles of each phase as they change as rotor position changes) to detect which one of the three phases has a voltage that is in between the other two. The voltages can be monitored by using a voltage sensing circuit coupled to each of the motor coils. This in-between condition changes over time, thus each phase periodically become the "in-between" phase. By way of example, referring to FIG. 3B, during the rotational angles between 30 and 90 degrees (as seen on the horizontal axis) the W phase has a voltage that is less than the U phase and greater than the V phase. Thus during this portion of the motor rotation cycle, the W phase is the in-between phase.

In generating the variable duty cycle PWM drive signal for the in-between phase, the processor generates an altered PWM drive signal that is shifted by 180 degrees. This shift can be seen by comparing FIG. 6, which illustrates a conventional drive signal, and FIG. 7, which illustrates the disclosed drive signal. Note that the V phase is the in-between phase in the illustrated snapshot in time and that the variable duty cycle signal shown at 102 in FIG. 7 is shifted in phase by 180 degrees relative to the same V phase duty cycle signal shown at 102 in FIG. 6. As illustrated, the comparison illustrates that the signal at 102 in FIG. 7 appears inverted (shifted in phase by 180 degrees) when compared to the signal at 102 in conventional FIG. 6.

Figure 6:
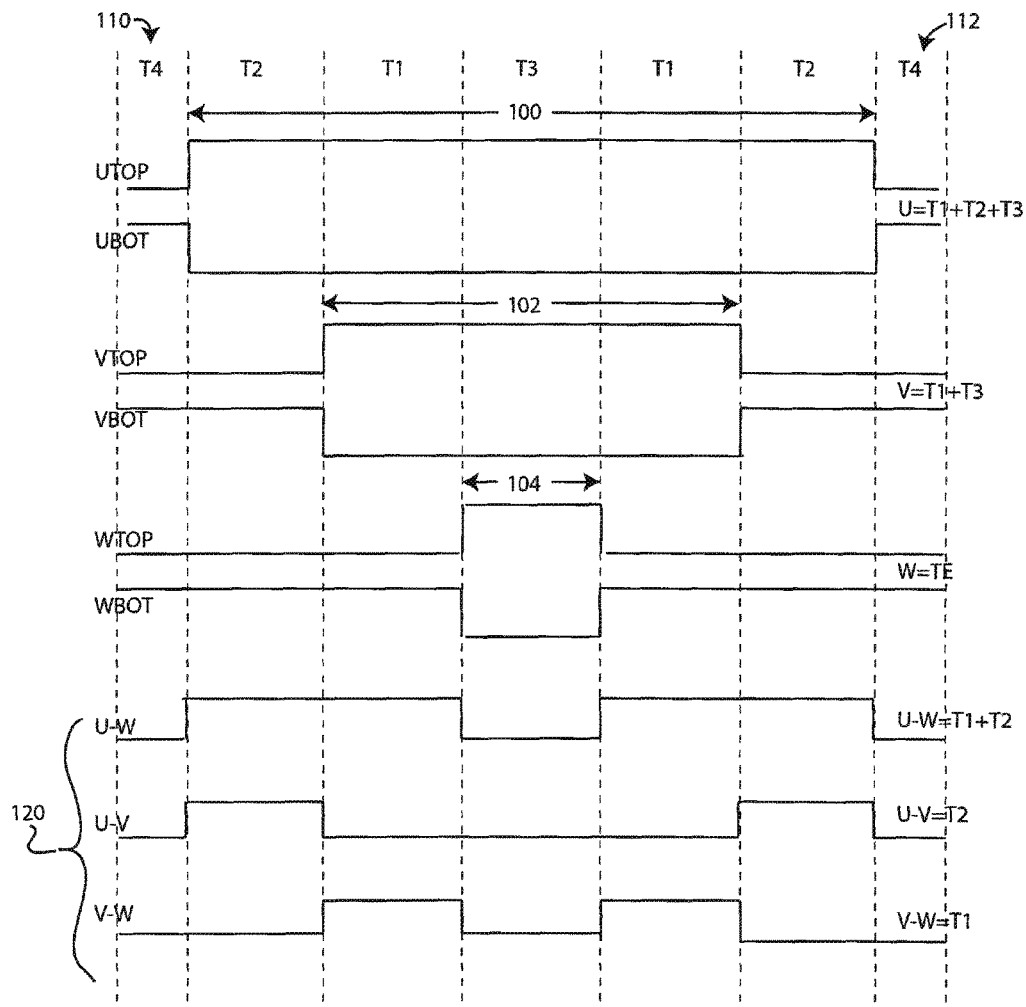
FIG. 6 shows the conventional duty cycle pattern for the three phases at a given snapshot in time.
Figure 7:
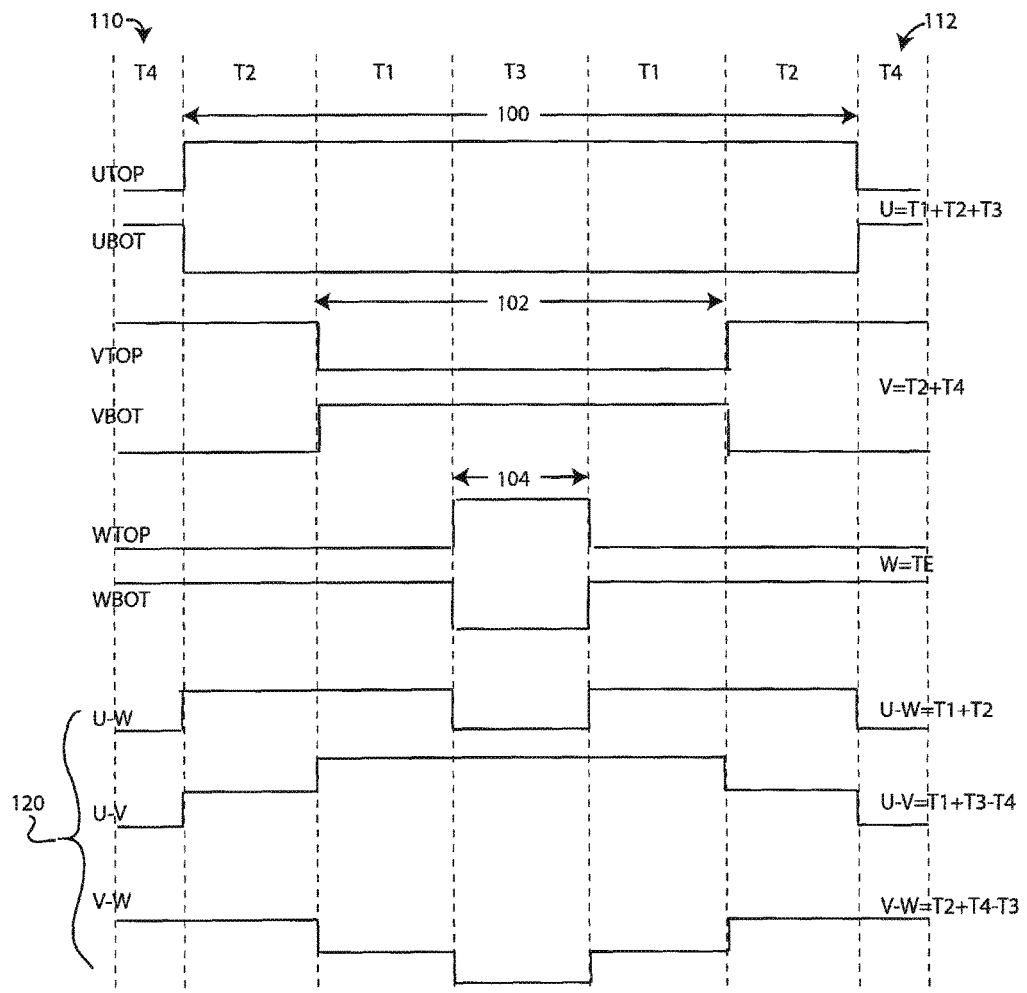
FIG. 7 shows, for comparison with FIG. 6, the duty cycle pattern for the three phases using the disclosed scheme, at a snapshot in time comparable to that of FIG. 6.

To appreciate how this modified PWM drive scheme avoids the zero vector condition, again compare FIGS. 6 and 7. In the conventional drive scheme (FIG. 6) there are times when all three transistors are concurrently switched on. For example, in the portion of the PWM waveforms falling in time region T3 show UTOP, VTOP and WTOP all in a high state at the same time. Similarly, UBOT, VBOT and WBOT are all in a low state at the same time. Compare this with the PWM waveforms of FIG. 7 (the disclosed improvement). As seen, the waveforms falling in time region T3 do not all exist at the same high or low state at the same time. This is accomplished because the in-between phase has been altered by processor 20 to follow a 180-degree shifted pattern.

Thus, the processor 20 is programmed to generate a special, non-standard waveform that eliminates the condition where all top transistors 28T-U, 28T-V and 28T-W are on simultaneously, and the condition where all bottom transistors 28B-U, 28B-V and 28B-W are on simultaneously. As noted above, these conditions do exist in the conventional pulse-width modulation scheme. We have discovered that in these conditions motor currents circulate within the coils themselves, instead of flowing in a direction from the DC supply rail to ground. We refer to this condition as the "zero vector" interval, because the vector sum of the respective currents in adjacent coils goes to zero. These zero vector intervals are "do nothing" periods and effectively short the motor phases together. As the respective coils switch into and out of this zero vector condition, circulating energy stored within the coils can produce current impulses that propagate through the H-bridge circuit.

In studying FIGS. 6 and 7, it is important to understand that (a) these figures show a particular snapshot in time and (b) that the time regions T1, T2, T3 and T4 shown in those figures themselves vary in width as the motor makes each revolution. Thus it should not be assumed that these time regions always correspond to equal time increments. Rather, each time region represents a time interval that varies as the motor rotates in order to produce transistor switching conditions that result in sinusoidal currents flowing through the three motor coils phased 120 degrees apart.

FIGS. 6 and 7 thus depict the respective duty cycles for the three phases at one instance in time, allowing the duty cycles of the phases to be compared. In FIG. 6 (conventional switching scheme), transistors 28T-U are switched on, and transistors 28B-U are concurrently switched off for a comparatively long time interval 100. During this same snapshot in time transistors 28T-V and 28B-V are switched on and off, respectively, for a shorter time interval 102. Likewise, transistors 28T-W and 28B-W are switched on for an even shorter time interval 104.

By comparing the time intervals 100, 102 and 104 in FIG. 6 one can see that during the entire interval 104, the transistors 28T for all three phases U, V and W are switched on, and the transistors 28B for all three phases U, V and W are switched off. Thus interval 104 corresponds to the zero vector interval, where all three phases have their respective top and bottom transistors shorted together.

The improved switching scheme is shown in FIG. 7. While the duty cycle waveforms for phases U and W are the same as in FIG. 6 (conventional), the V phase is different: the V phase is shifted 180 degrees from the conventional, such that transistors 28T-V are switched off during interval 102, while transistors 28B-V are switched on. By virtue of the 180-degree phase reversal of the duty cycle pattern of one of the phases (i.e., the V phase) the zero vector condition is entirely avoided.

It should be kept in mind that FIGS. 6 and 7 represent a single snapshot in time. As the entire variable duty cycle control sequence continues to run for each of the three phases, the duty cycle for each phase will repeatedly grow and collapse in a cyclic fashion to produce the desired sinusoidal output. Thus at a different snapshot in time, the U phase might have the shortest time interval, while the W phase might have the longest. Regardless of this cyclic duty cycle modulation, one of the three phases will be inverted (as the V phase is inverted in FIG. 7) and this phase inversion avoids the zero vector condition.

With reference to FIG. 2, it will be recalled that the three coils L1, L2 and L3 comprising the motor windings are connected in a star configuration, each having one terminal coupled to one of the U, V, and W terminals. Thus the energization state of pairs of coils (L1-L3, L1-L2 and L2-L3) is determined by a combination of two duty cycle modulation waveforms. This has been illustrated in FIGS. 6 and 7 by the resultant switching patterns U-W, U-V and V-W. When each of these respective switching patterns is high, current flows through the associated pairs of coils; when the waveform is low, current does not flow. Again, keep in mind that FIGS. 6 and 7 represent but a single snapshot in time. Although the principle is the same as the duty cycle modulation proceeds, the respective energization times and current flow polarities will sinusoidally vary.

Because the motor coils are Y-connected they are energized in pairs: (L1-L3), (L1-L2) and (L2-L3). The three U, V and W switching patterns can be considered in groups, representing different energizing cases: (U-V, U-W and V-W). Delta-connected motor coils (not shown) are also energized in this fashion.

FIG. 7 shows at 120 the resultant waveforms for each of these cases (U-V, U-W and V-W). For comparison, see FIG. 6 at 120, which shows the resultant waveforms for each of these cases for a conventional modulation scheme. Note that while the U-W case is the same in both FIGS. 6 and 7, the U-V and V-W cases are different.

To better understand how these three modulation patterns are formed, FIGS. 6 and 7 have been subdivided into time regions designated T1, T2, T3 and T4. Note that time regions T1 and T2 appear twice as wide as time regions T3 and T4. However, these relative widths of the various time regions are an artifact of the particular snapshot in time represented by FIGS. 6 and 7. In general, each of the time regions is constantly changing (increasing and decreasing in size) as the rotational cycle of the motor progresses.

Also note that time regions T1 and T2 appear to have been split into two halves that are arranged in mirrored symmetry on each side of the T3 region. Also note that, due to how the left and right sides of the modulation patterns are cut off in FIGS. 6 and 7, two T4 regions (each half-wide) are shown at 110 and 112. These are also artifacts of the way FIGS. 6 and 7 have been drawn. Only one motor rotational cycle has been shown on the page. Nevertheless, referring to the resultant waveforms at 120 in FIGS. 6 and 7, it can be seen that for the conventional switching topology (FIG. 6) the resultant waveforms for each of the cases U-V, U-W and V-W can be expressed in terms of the time regions T1, T2, T3 and T4 as follows:

$U-W=T1+T2$ $U-V=T2$ $V-W=T1$

In comparison, for the improved switching topology of the present disclosure, the resultant waveforms can be expressed as follows:

$U-W=T1+T2$ (same as conventional)

$U-V=T1+T3-T4$ (different from conventional)

$V-W=T2+T4-T3$ (different from conventional)

Upon examination of these resultant waveforms, one can see that the zero vector condition (where all three phases are shorted together) that exists conventionally in time region T3 is avoided in the improved switching topology. To see this, note in the conventional case (FIG. 6) that in the time region T3, the top transistors 28T are all on at the same time and the bottom transistors 28B are all off at the same time. In comparison, with the improved topology (FIG. 7) the respective top transistors 28T and bottom transistors 28B are not all switched to the same on-off states in time region T3. Thus the zero vector condition is avoided.

Although the zero vector condition is avoided, and the switching topology is different, the improved topology nevertheless produces properly-formed sinusoidal waveforms that are phased 120 degrees apart. Thus the motor 26 receives the same energization as with the conventional topology. The pulse-width modulation of the improved topology is indeed different from the conventional design; yet the resultant sinusoidal currents flowing through the three motor coils L1, L2 and L3 are the same.

Figure 3B:
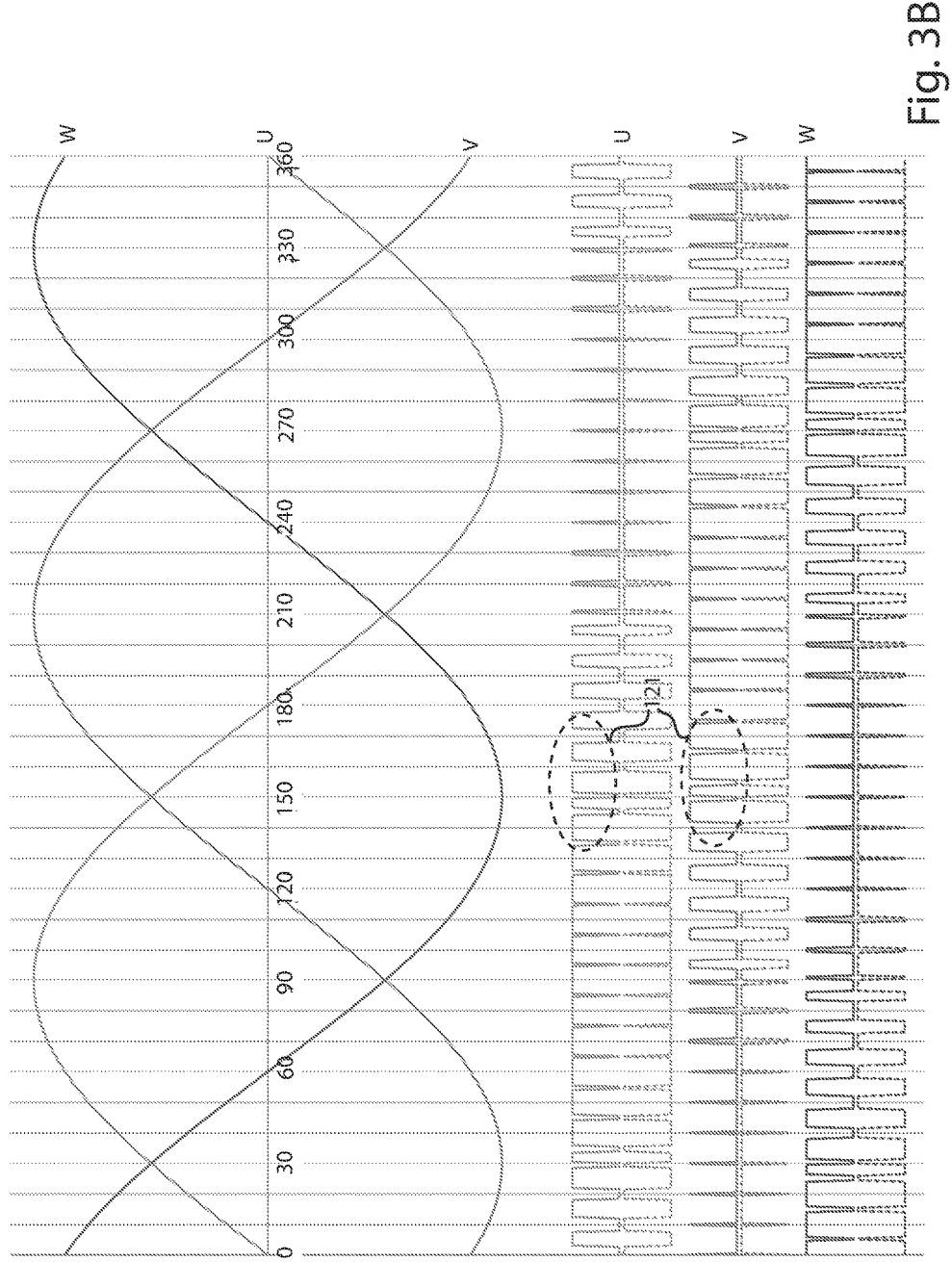
FIG. 3B shows the pulse-width modulation and resulting AC sinusoidal waveforms for the improved no-zero vector drive scheme, and also shows a graph in the middle of the sine waves illustrating that there are no periods when the motor phases are shorted.

To see the overall picture of how these duty cycle variations affect the resultant motor drive currents, refer to FIGS. 3A and 3B. FIG. 3A shows the conventional variable duty cycle control scheme, while FIG. 3B shows the improved control scheme. Comparing these two figures, note first that the respective U, V and W phase motor currents are the same; they are all sinusoidal and phased 120 degrees apart. The respective variable duty cycle waveforms are different, however. To see this, compare the region 121 in the two figures.

Figure 12:
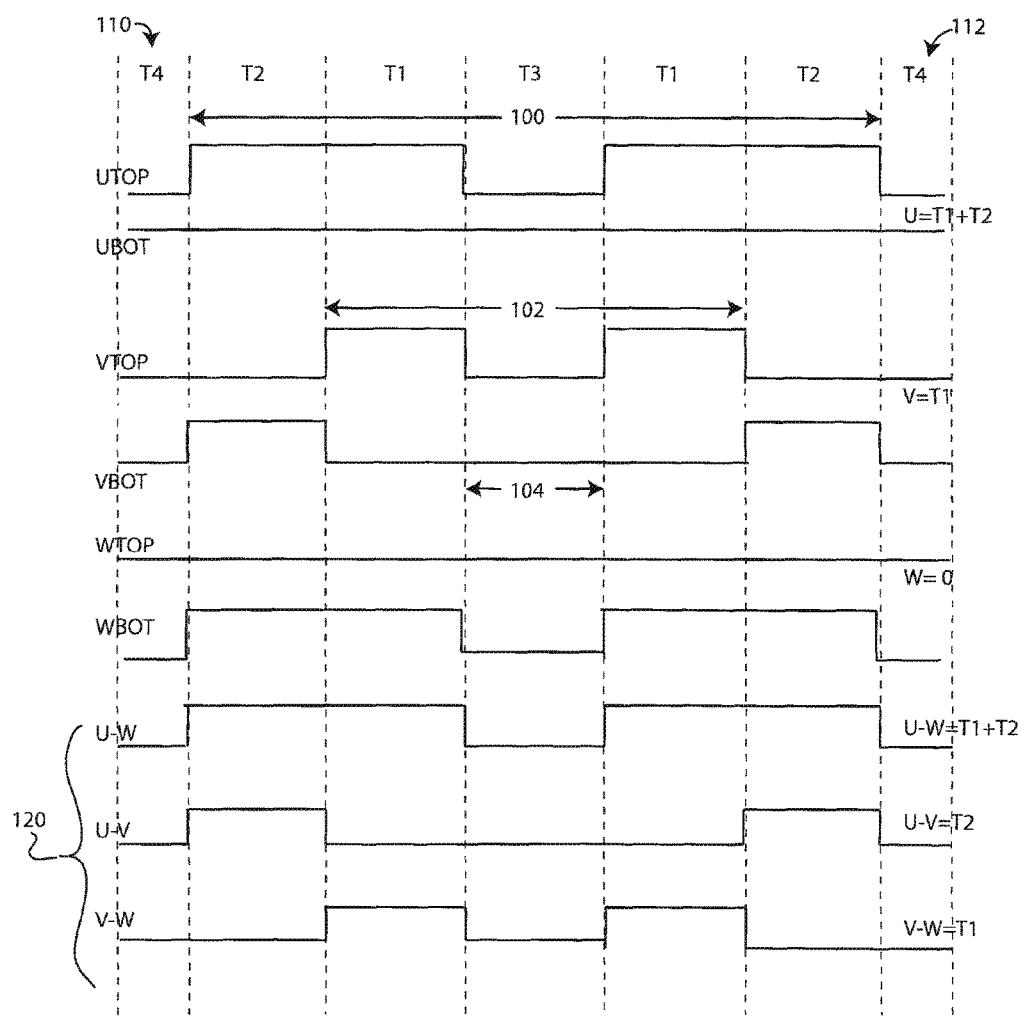
FIG. 12 shows, for the embodiment of FIGS. 8-10 and for comparison with FIG. 6, the duty cycle pattern for the three phases using the disclosed logic gate circuit, at a snapshot in time comparable to that of FIG. 6.

FIGS. 8-10 show another embodiment that employs a logic-gated switching circuit to eliminate the spurious current problem. This embodiment uses a standard software-generated drive signal that is modified by a logic-gating circuit which includes a pair of logic gate circuits 86T and 86B that are interposed between the output terminals 84 of the PWM drive circuit 80 and the respective gate terminals of transistors 28T and 28B of the H-bridge circuit 18. Logic gate circuits 86T and 86B each comprise an interconnection of individual logic gates, as illustrated in FIG. 9. FIG. 12 shows the resultant waveforms for the logic-gated switching circuit embodiment for a snapshot in time comparable to that of FIG. 6 for comparison.

Referring to FIG. 9, the logic gate circuit 86 (86T and 86B) employs a NOR gate 88 having three inputs connected respectively to the U, V and W upper and lower terminals of the PWM drive circuit. The output of NOR gate 88 is coupled to one input of each of three OR gates 90, 92 and 94. Each of these OR gates has a second input that is connected to one of the U, V and W terminals, as illustrated. The OR gates provide respective Uout, Vout and Wout signals that are applied to the gates of the transistors of the H-bridge circuit 18.

While the logic gate circuit of FIG. 9 has been illustrated using NOR and OR gates with active low logic, those of skill in the art will understand that different gates and/or programmed processor can produce the same logical outputs. In this regard, refer to FIG. 10 which shows the truth table for the logic gate circuit 86. By examining this truth table, one can see that the logic gate circuit essentially passes unchanged the logic of the states shown at 96 and 100 in FIG. 10. The logic gate circuit reverses the logical polarity for the states shown at 98. In other words, as shown at 98, when the U, V and W terminals are set to (0, 0, 0) the logic gate circuit outputs (1, 1, 1).

Figure 5:
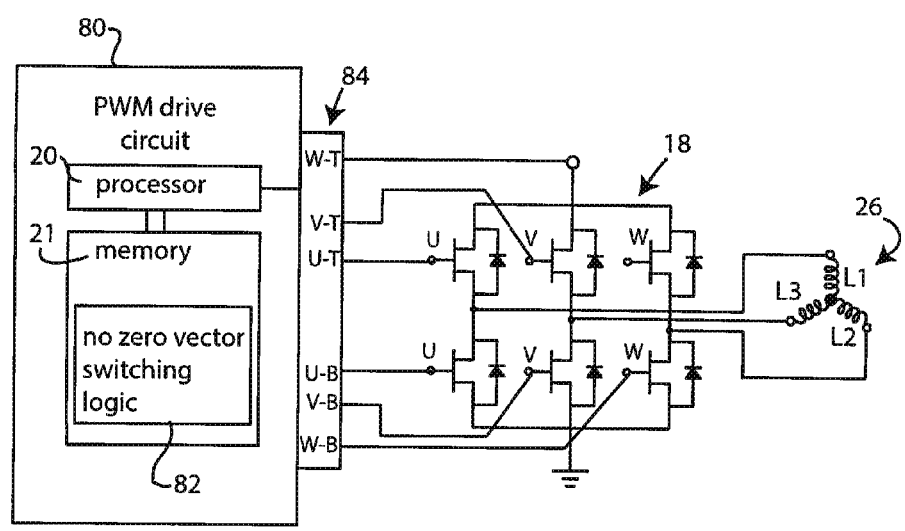
FIG. 5 shows a first embodiment of the disclosed scheme.

In a somewhat different approach to the embodiment of FIG. 5, the embodiment of FIGS. 8-10 eliminates the effect of the zero vector condition by using the logic gating circuits to alter how the transistors are energized during the zero vector condition. In this way the embodiment of FIGS. 8-10 is also effective in mitigating the generation of spurious transient currents. In addition, the embodiment of FIGS. 8-10 has the additional advantage of driving the motor more efficiently. By way of example, using a Stanley Black & Decker model QPM tool, the following motor currents were measured at full speed under load:

Using conventional switching topology: 400 mA;
Using no-zero vector switching (FIG. 5 embodiment): >400 mA;

Using logic-gated switching (FIG. 8 embodiment): 100 mA.

The improved efficiency results from the manner in which the zero vector condition is handled. In the conventional switching topology, as explained above, no attempt is made to address the zero vector switching state. Thus during the conventional PWM drive sequence the terminals of all three phases are momentarily shorted together. Being shorted together results in the currents flowing through the motor windings in a direction that produces momentary braking of the motor. Because the zero vector switching state is so short, no appreciable change in net speed will be detected; nevertheless, energy is being lost as heat.

With the no-zero vector switching embodiment of FIG. 5, the zero vector switching state is avoided: the three phases are not shorted together as in the conventional case. Instead, the phases are driven during the unformed "zero vector" interval to produce current flow that is opposite to the normal flow. Thus for that brief moment the motor is energized in a reverse direction. This will also have the effect of applying momentary braking. As with the conventional case, no appreciable speed change is detected; yet some energy is lost as heat.

With the logic-gated switching embodiment of FIG. 8, the phases are driven during the unformed "zero vector" interval so that the top and bottom pairs of transistors are placed in a conductive state that allows the motor to simply coast. No energy is applied in either the forward or reverse direction during the unformed "zero vector" interval. This results in an overall lower consumption of energy by the motor, thus explaining the improved efficiency shown in the above data.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A circuit for controlling a rotating three-phase motor of the type having three interconnected motor coils each corresponding to one of three phases, comprising:

a plurality of switching circuit components and each connected to the motor to supply current to one of said coils;

a signal generator circuit producing in synchronism with the rotation of the motor a variable duty cycle pulse-width modulated signal for each of the switching circuit components; and a logic gating circuit coupled to the signal generator circuit and to the switching circuit components and being operative:

(a) to cause the switching circuit components to selectively place pairs of motor coils in current conducting states such that when the variable duty cycle pulse-width modulated signals are each concurrently in the same logical first state, the logic gating circuit supplies a logical first state to each of the switching circuit components; and (b) to cause the switching circuit components to selectively place pairs of motor coils in current conducting states such that when the variable duty cycle pulse-width modulated signals are each concurrently in the same logical second state, the logic gating circuit supplies a logical first state to each of the switching circuit components such that the logical second state differs from the logical first state.

2. The circuit of claim 1 wherein each of the plurality of switching circuit components comprises a pair of transistors, one coupled to supply a direct current voltage to a motor coil when turned on and one coupled to supply a ground potential to a motor coil when turned on.

3. The circuit of claim 1 further comprising a position sensor that determines the instantaneous position of the motor and wherein the signal generator circuit uses the instantaneous position to maintain the variable duty cycle pulse-width modulated signal for each of the switching circuit components in synchronism with the rotation of the motor.

4. The circuit of claim 1 wherein the signal generator circuit is a processor programmed to generate said variable duty cycle pulse-width modulated signals.

5. The circuit of claim 1 wherein a processor is programmed to generate the variable duty cycle pulse-width modulated signal for each of the switching circuit components by receiving a time varying sawtooth waveform and by generating and comparing dynamically changing reference values to the sawtooth waveform.

* * * * *